US00RE50386E

(19) United States
(12) Reissued Patent
Meyvaert et al.

(10) Patent Number: US RE50,386 E
(45) Date of Reissued Patent: Apr. 15, 2025

(54) CIRCUITS AND METHODS FOR MEASURING THE OUTPUT CURRENT OF A SWITCHED CAPACITOR REGULATOR

(71) Applicant: Lion Semiconductor Inc., Austin, TX (US)

(72) Inventors: Hans Meyvaert, Leuven (BE); Thomas Li, Mountain View, CA (US); Fred Chen, Oakland, CA (US); John Crossley, Oakland, CA (US); Zhipeng Li, Fremont, CA (US); Bertram J. Rodgers, San Francisco, CA (US)

(73) Assignee: Lion Semiconductor Inc., Austin, TX (US)

(21) Appl. No.: 17/869,691

(22) Filed: Jul. 20, 2022

Related U.S. Patent Documents

Reissue of:
(64) Patent No.: 10,720,832
Issued: Jul. 21, 2020
Appl. No.: 16/264,079
Filed: Jan. 31, 2019

U.S. Applications:
(60) Provisional application No. 62/756,064, filed on Nov. 5, 2018.

(51) Int. Cl.
*H02M 3/07* (2006.01)
*H02M 1/00* (2007.01)
*H02M 3/158* (2006.01)

(52) U.S. Cl.
CPC ..... *H02M 3/07* (2013.01); *H02M 3/158* (2013.01); *H02M 1/0009* (2021.05); *H02M 1/0054* (2021.05)

(58) Field of Classification Search
CPC ..... H02M 3/07; H02M 3/158; H02M 1/0009; H02M 1/0054; Y02B 70/10; G01R 19/0092
See application file for complete search history.

(56) References Cited

U.S. PATENT DOCUMENTS 7,068,094 B1 * 6/2006 Jamal ..... H02M 3/07 327/536
9,300,210 B1 3/2016 Lidsky et al.
(Continued)

FOREIGN PATENT DOCUMENTS

EP 2843425 3/2015
KR 101911184 10/2018

OTHER PUBLICATIONS

Examination Report dated Sep. 7, 2021 in EP Patent Application No. 19883223.0, pp. 1-11.
(Continued)

*Primary Examiner* — Kenneth Whittington
(74) *Attorney, Agent, or Firm* — Byrne Poh LLP

(57) ABSTRACT

Circuits comprising: a capacitor; switches that, when State0, couple the capacitor in parallel with the load and, when State1, couple the capacitor in series with the load, wherein a first of the switches connects the capacitor to ground when in State0 and wherein a second of the switches connects the capacitor to an input voltage when in State1; a third switch, wherein a first side of the third switch is connected to the capacitor identically to one of the first switch and the second switch (OFWSW), wherein the third switch switches identically to the OFWSW, wherein the third switch is smaller than the OFWSW; a first resistor connected to the second side of the third switch; and a hardware processor that measures a current flowing through the first resistor and estimates the current provided to the load based on the current measured as flowing through the first resistor.

25 Claims, 4 Drawing Sheets

(56) References Cited

U.S. PATENT DOCUMENTS

| | | | | |
|---|---|---|---|---|
| 9,653,990 | B1 * | 5/2017 | Wang | H02M 1/36 |
| 10,564,191 | B2 * | 2/2020 | Novak | G01R 19/2513 |
| 2007/0176671 | A1 * | 8/2007 | Ishida | H02M 3/07 327/536 |
| 2008/0122522 | A1 * | 5/2008 | Nagasawa | H02M 1/36 327/536 |
| 2011/0018511 | A1 * | 1/2011 | Carpenter | H02M 3/158 323/282 |
| 2012/0224288 | A1 * | 9/2012 | Uota | H03K 17/18 361/79 |
| 2013/0249512 | A1 * | 9/2013 | Saito | H01L 23/495 323/271 |
| 2013/0300385 | A1 * | 11/2013 | Li | H02M 3/07 323/271 |
| 2016/0054749 | A1 * | 2/2016 | Fujiwara | G05F 1/575 323/273 |
| 2016/0211739 | A1 * | 7/2016 | Hissink | H03F 1/523 |
| 2016/0261189 | A1 | 9/2016 | Lidsky et al. | |
| 2016/0315539 | A1 * | 10/2016 | Lee | H02M 3/158 |
| 2017/0133842 | A1 * | 5/2017 | Freeman | H02J 7/0068 |
| 2018/0006643 | A1 * | 1/2018 | Schulmeyer | H03K 17/0822 |
| 2018/0054121 | A1 * | 2/2018 | Chen | H02M 3/158 |
| 2018/0123452 | A1 * | 5/2018 | Meyvaert | H02M 3/07 |
| 2018/0269869 | A1 * | 9/2018 | Mukhopadhyay | H02M 1/08 |
| 2019/0006933 | A1 * | 1/2019 | Lidsky | H02M 3/158 |

OTHER PUBLICATIONS

Extended European Search Report dated Aug. 12, 2021 in EP Patent Application No. 19883223.0, pp. 1-4.
International Search Report and Written Opinion dated Nov. 20, 2019 in International Patent Application No. PCT/US2019/057659, pp. 1-8.
Notice of Allowance dated May 6, 2020 in U.S. Appl. No. 16/264,079, pp. 1-35.
Notice of Allowance dated Jun. 11, 2021 in KR Patent Application No. 10-2021-7003914, pp. 1-6.
Notification of Reexamination dated Jul. 28, 2023 in CN Patent Application No. 201980067497.X, pp. 1-12.
Office Action dated Jan. 10, 2020 in U.S. Appl. No. 16/264,079, pp. 1-37.
Office Action dated Jun. 16, 2022 in CN Patent Application No. 201980067497.X, pp. 1-15.
Office Action dated Aug. 8, 2019 in U.S. Appl. No. 16/264,079, pp. 1-27.
Office Action dated Sep. 26, 2022 in CN Patent Application No. 201980067497.X, pp. 1-13.
Office Action dated Dec. 31, 2021 in CN Patent Application No. 201980067497.X, pp. 1-18.
Decision of Re-Examination dated Apr. 29, 2024 in CN Patent Application No. 201980067497.X, pp. 1-20.
International Search Report and Written Opinion dated Nov. 20, 2019 in International Patent Application No. PCT/US2019/057659.

* cited by examiner

CIRCUITS AND METHODS FOR MEASURING THE OUTPUT CURRENT OF A SWITCHED CAPACITOR REGULATOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application claims the benefit of U.S. Provisional Patent Application No. 62/756,064, filed Nov. 5, 2018, which is hereby incorporated by reference herein in its entirety.

BACKGROUND

Switched Capacitor (SC) regulators can be used in various applications including direct-current-to-direct-current (DC/DC) converters and battery charger integrated circuits (ICs).

It can be helpful to measure the output current of a Switched Capacitor (SC) regulator. For example, it can be helpful to measure the output current of an SC battery charger IC so that the SC battery charger IC can regulate a charge current used to charge a battery. To regulate the charge current, the charger IC needs to measure its output current and determine if it is larger or smaller than a target output current value. Based on that result, the charger IC can adjust the output current to be as similar as possible to the target value. In another example, it can be helpful to measure output power in a SC DC/DC converter by measuring output current and multiplying it by an output voltage. In a power management IC (PMIC) with multiple SC DC/DC converters, it can be helpful to measure the output power of each SC DC/DC converter so that the PMIC can keep track of how much power is consumed by each DC/DC converter.

While it is useful to measure output current, prior techniques for doing so are inefficient from a power usage perspective. A straightforward way to measure output current is to add a series resistor at the output and measure the voltage across the resistor as illustrated in FIG. 1. Since IR=V, measuring the voltage across the resistor $R_{SERIES}$ 120 and dividing by the resistor value can compute the amount of current flowing through $R_{SERIES}$ 120. The problem with this approach is that there is power loss of $I^2R$. If R is equal to 5 milliOhms and I is equal to 5 Amps, $I^2R$ power loss is equal to 125 milliWatts. It is possible to reduce R to reduce $I^2R$ loss. However, a small R value results in a small IR=V value, and it becomes more difficult to sense the small voltage value (e.g., a higher bit analog to digital converter is needed to sense smaller voltages).

Accordingly, new mechanisms (which can include circuits and methods) for measuring the output current of a switched capacitor (SC) regulator are desirable.

SUMMARY

Circuits and methods for measuring the output current of a switched capacitor regulator are provided. In some embodiments, circuits for measuring a current provided to a load comprising: a capacitor having a first side and a second side; a plurality of switches that, when in a first state, couple the capacitor in parallel with the load and, when in a second state, coupled the capacitor in series with the load, wherein a first switch of the plurality of switches connects the first side of the capacitor to ground when the plurality of switches are in the first state and wherein a second switch of the plurality of switches connects the second side of the capacitor to an input voltage when the plurality of switches are in the second state; a third switch having a first side and a second side, wherein the first side of the third switch is connected to the capacitor identically to one of the first switch and the second switch, wherein the third switch switches identically to the one of the first switch and the second switch, wherein the third switch is smaller than the one of the first switch and the second switch; a first resistor having a first side and a second side, wherein the first side of the first resistor is connected to the second side the third switch; and a hardware processor that measures a current flowing through the first resistor and estimates the current provided to the load based on the current measured as flowing through the first resistor.

DETAILED DESCRIPTION

Mechanisms (which can include circuits and methods) for measuring the output current of a switched capacitor (SC) regulator are provided.

In some embodiments, the mechanisms can measure the output current of a SC regulator by measuring input current ($I_{IN}$) to the SC regulator, measuring the output voltage ($V_{OUT}$) of the SC regulator, measuring the input voltage ($V_{IN}$) to the SC regulator, and calculating the output current ($I_{OUT}$) based on these measurements and an efficiency estimate.

For example, in some embodiments, the efficiency estimate can be calculated during a calibration process using the following equation:

$$\text{Efficiency}=P_{OUT}/P_{IN}=(V_{OUT}\times I_{OUT})/(V_{IN}\times I_{IN}),$$

where $V_{IN}$, $V_{OUT}$, $I_{IN}$, and $I_{OUT}$ are measured under expected operating conditions. Then, during operation, $I_{OUT}$ can be calculated using the following equation:

$$I_{OUT}=\text{Efficiency}\times(V_{IN}\times I_{IN})/V_{OUT},$$

Figure 1:
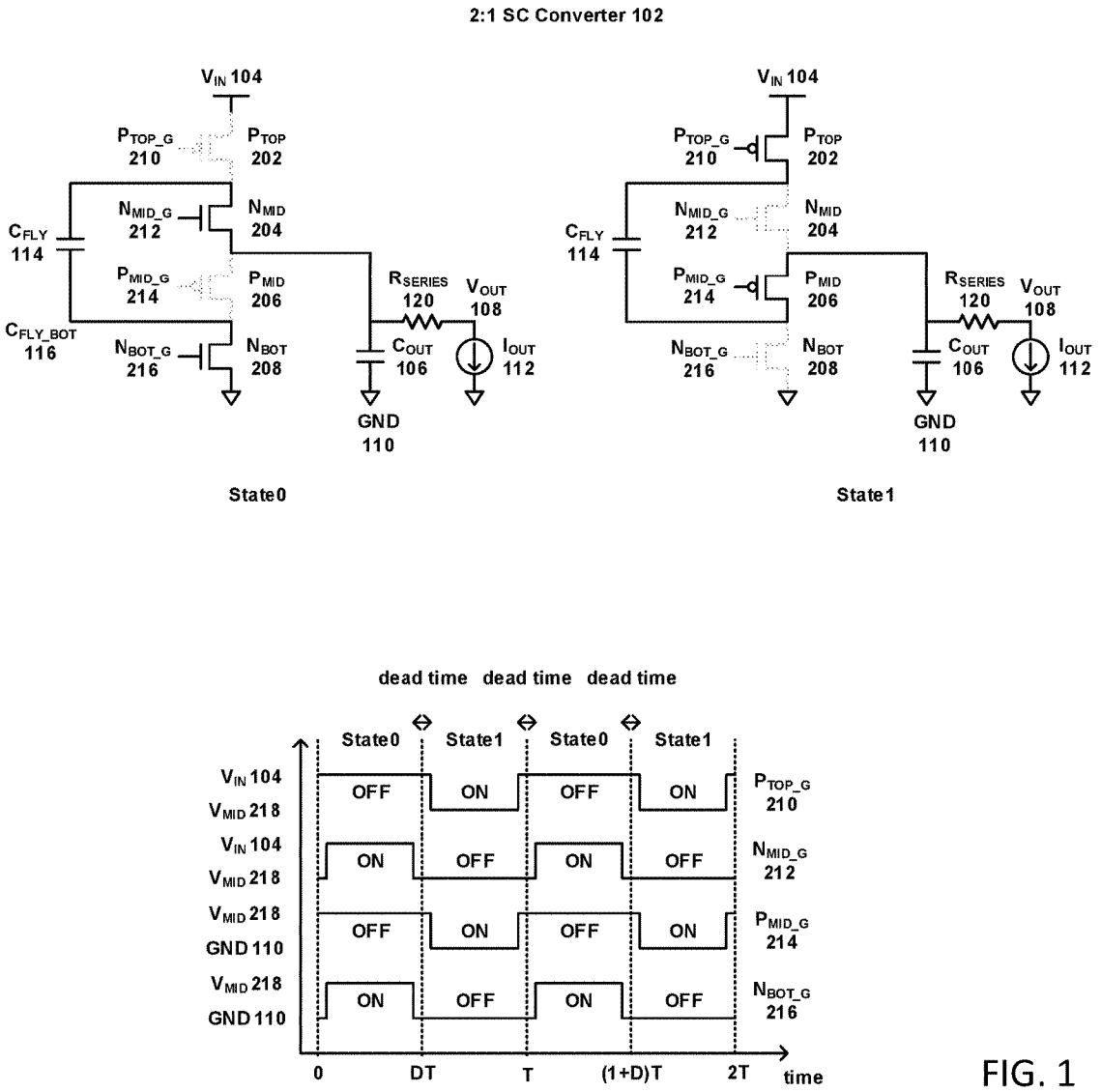
FIG. 1 (PRIOR ART)
FIG. 1 is schematic diagram of an example of a switched capacitor converter in accordance with the prior art.

In some embodiments, efficiency can be estimated using pre-simulated data and stored in memory in an SC regulator integrated circuit (IC) or in external memory. $V_{IN}$ and $V_{OUT}$ can be measured in any suitable manner, such as using an analog to digital converter (ADC), for example. In some cases, $V_{IN}$ and $V_{OUT}$ values need not be measured when set to given values by an SC regulator, for example. $I_{IN}$ can be determined by measuring the voltage across a resistor in series with $V_{IN}$ (which can be done in any suitable manner, such as using an ADC) and calculating for the current passing through that resistor (as described above). While this technique will incur an $I^2R$ loss in the resistor, the $I^2R$ loss of measuring $I_{IN}$ using a resistor is smaller than the $I^2R$ loss of measuring $I_{OUT}$ when $I_{IN}$ is smaller than $I_{OUT}$. For example, in a 2:1 SC regulator, the input current is roughly 50% of the output current, so $I^2R$ loss when $I_{IN}$ is measured is roughly 25% of the $I^2R$ loss when $I_{OUT}$ is measured. An advantage of measuring $I_{OUT}$ in this manner is that it is less lossy to measure $I_{IN}$, $V_{OUT}$, and $V_{IN}$ and use an estimate efficiency to calculate $I_{OUT}$ than to measure $I_{OUT}$ as shown in FIG. 1. A disadvantage of measuring $I_{OUT}$ in this manner is that it is less accurate than measuring $I_{OUT}$ directly using a series resistor at the output of the SC regulator (as shown in FIG. 1) because errors in the efficiency estimate and the measurements of $V_{IN}$, $I_{IN}$, $V_{OUT}$ can compound.

In some embodiments, the mechanisms can measure the output current of a SC regulator by measuring the output impedance ($R_{OUT}$) of the SC regulator and calculate $I_{OUT}$. For example, in a N:M SC regulator, the following equation computes $I_{OUT}$:

$$I_{OUT}=(V_{IN}\times M/N-V_{OUT})/R_{OUT}.$$

M and N are known based on the SC regulator design, and $V_{IN}$ and $V_{OUT}$ can be measured using an ADC in some embodiments. $R_{OUT}$ is a function of the SC regulator topology (e.g., the values of N and M in the N:M SC regulator), switch on-state resistance (because switches are non-ideal and have parasitic resistance even when they are ON), the switching frequency of the SC regulator (freq), and the amount of flying capacitance ($C_{FLY}$). Thus, $R_{OUT}$ can be represented by:

$$R_{OUT}=f(\text{topology},R_{SWITCH},\text{freq},C_{FLY})$$

Among these variables, topology and $C_{FLY}$ are known since they are decided by the designer in design time. In some embodiments, freq can be measured in any suitable manner (e.g., using counters to count how quickly the signals switch). In some embodiments, $R_{SWITCH}$ can be measured in any suitable manner (e.g., during calibration by flowing a known current through the switch and measuring the voltage across the switch). The calculated $R_{SWITCH}$ value can be stored in in a memory, whether it is in the SC regulator chip or external memory, in some embodiments. An advantage of this method of calculating $I_{OUT}$ is that it does not incur the $I^2R$ loss of using a series resistor. A disadvantage is that it can be less accurate if errors in measuring these variables compound.

In some embodiments, the mechanisms can measure the output current of a SC regulator by adding a small switch and a series small resistor in parallel with a switch of the SC regulator and using that small resistor to estimate the output current of the SC regulator.

Figure 2:
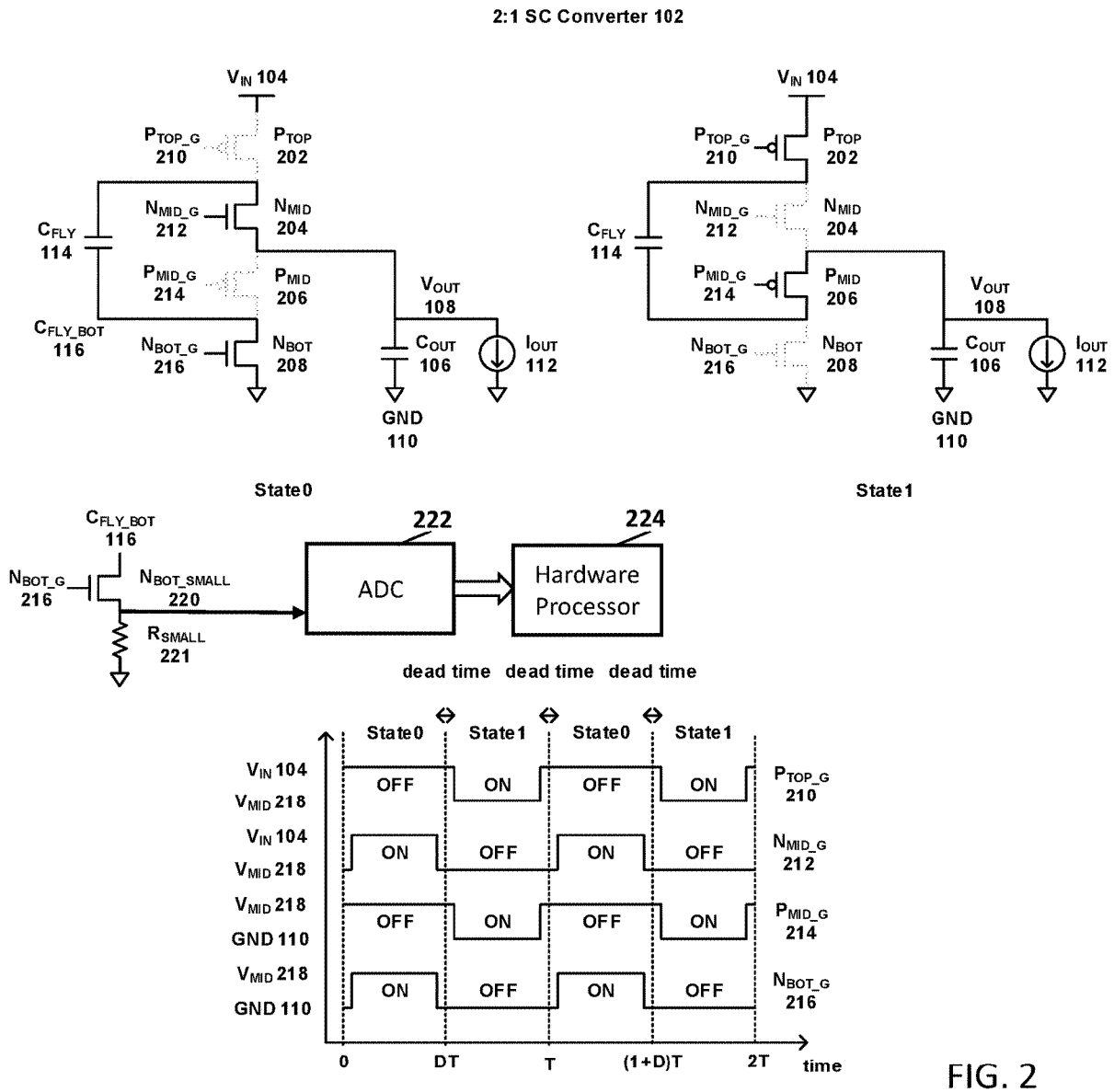
FIG. 2 is schematic diagram of an example of a switched capacitor converter using a small switch and a small resistor to estimate output current in accordance with some embodiments.

FIG. 2 illustrates an example of a 2:1 SC regulator using this technique on $N_{BOT}$ 208 in accordance with some embodiments. As shown, a small switch $N_{BOT_SMALL}$ 220 (with similar characteristics to $N_{BOT}$ 208 except that it has a much smaller width than $N_{BOT}$ 208) and a small resistor $R_{SMALL}$ 221 are connected in parallel to $N_{BOT}$ 208. That is, the gate of switch $N_{BOT_SMALL}$ 220 is connected to $N_{BOT_G}$ 216, the top of $N_{BOT_SMALL}$ 220 is connected to node $C_{FLY}$ BOT 116, and the bottom of $N_{BOT_SMALL}$ 220 is connected via resistor $R_{SMALL}$ 221 to ground. For example, if the width of $N_{BOT_SMALL}$ 220 is 1/1000 of the width of $N_{BOT}$ 208, the current flowing through $N_{BOT_SMALL}$ 220 is also roughly 1/1000 of the current flowing through $N_{BOT}$ 208. Once the current value is reduced, it is easier to measure the current with smaller loss. For example, the $I^2R$ loss through $R_{SMALL}$ would be 1/1,000,000 compared to using a series resistor on $N_{BOT}$ 208.

During operation, the current through $N_{BOT}$ 208 can be measured by measuring the voltage across $R_{SMALL}$ 221 and dividing that by the value of $R_{SMALL}$ 221 to measure the current through $N_{BOT_SMALL}$ 220, and then by multiplying the resulting value by 1000 if $N_{BOT}$ 208 has 1000 times larger width than $N_{BOT_SMALL}$ 220. If the 2:1 SC regulator is operating at 50% duty cycle, $I_{OUT}$ 112 can be estimated to be roughly two times the current through $N_{BOT}$ 208. The voltage can be measured in any suitable manner such as using an analog-to-digital converter (ADC) 222 that is coupled to a hardware processor 224.

Although resistor $R_{SMALL}$ 221 is shown in FIG. 2 on the lower side of switch $N_{BOT_SMALL}$ 220, the resistor can instead be placed on the upper side of switch $N_{BOT_SMALL}$ 220 in some embodiments.

Figure 3:
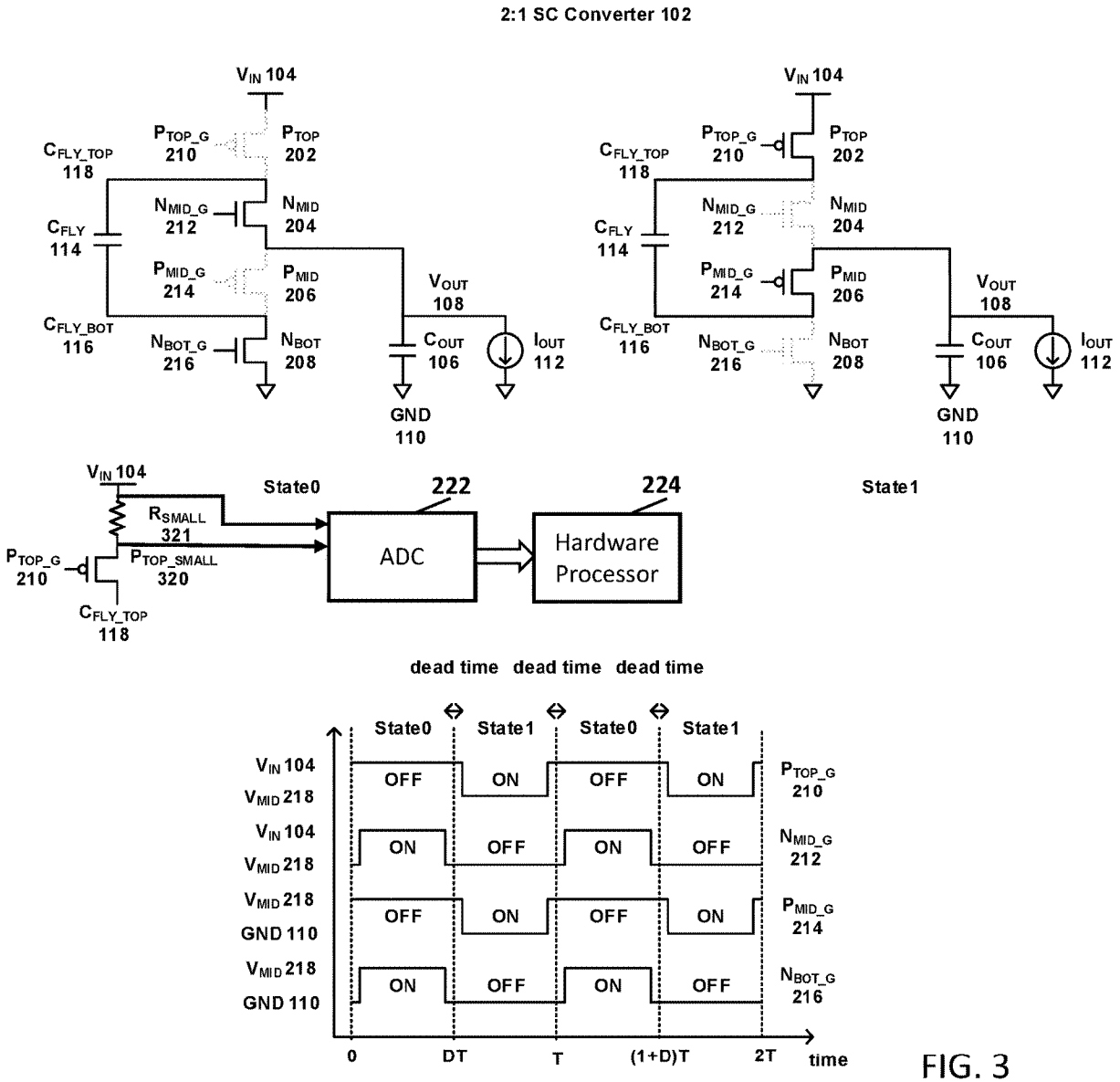
FIG. 3 is schematic diagram of another example of a switched capacitor converter using a small switch and a small resistor to estimate output current in accordance with some embodiments.

FIG. 3 illustrates an example of a 2:1 SC regulator using this technique on $P_{TOP}$ 202 in accordance with some embodiments. As shown, a small switch $P_{TOP_SMALL}$ 320 (with similar characteristics to $P_{TOP}$ 202 except that it has a much smaller width than $P_{TOP}$ 202) and a small resistor $R_{SMALL}$ 321 are connected in parallel to $P_{TOP}$ 202. That is, the gate of switch $P_{TOP_SMALL}$ 320 is connected to $P_{TOP}$ G 210, the top of $P_{TOP}$ SMALL 320 is connected via resistor $R_{SMALL}$ 321 to $V_{IN}$ 104, and the bottom of $P_{TOP}$ SMALL 320 is connected to node $C_{FLY}$ TOP 118. Similar to $N_{BOT_SMALL}$ 220 for $N_{BOT}$ 208, the width of $P_{TOP}$ SMALL 320 can be, for example, 1/1000 the width of $P_{TOP}$ 202. If the 2:1 SC regulator is operating at 50% duty cycle, we can estimate that Tour 112 is roughly two times the current through $P_{TOP}$ 202. The voltage can be measured in any suitable manner such as using an analog-to-digital converter (ADC) 222 that is coupled to a hardware processor 224.

To calculate $I_{OUT}$ 112 more accurately, some embodiments can implement both $N_{BOT_SMALL}$ 220 and $R_{SMALL}$ 221 and $P_{TOP_SMALL}$ 320 and $R_{SMALL}$ 321. Instead of assuming the current in State0 and State1 are equal when duty cycle is 50%, the current flowing in both State0 and State1 can be calculated using $N_{BOT_SMALL}$ 220 and $R_{SMALL}$ 221 and $P_{TOP_SMALL}$ 320 and $R_{SMALL}$ 321, respectively, and adding the two current values results in $I_{OUT}$ 112.

Although resistor $R_{SMALL}$ 321 is shown in FIG. 3 on the upper side of switch $P_{TOP_SMALL}$ 320, the resistor can instead be placed on the lower side of switch $P_{TOP_SMALL}$ 320 in some embodiments.

In some embodiments, when using multi-phase SC regulators in which copies of SC regulators are operating in parallel in a time interleaved fashion, if there are N phases, the measured per phase current (that can be calculated as illustrated above in connection with FIGS. 2 and 3) can be multiplied by N to calculate $I_{OUT}$ 112.

Figure 4:
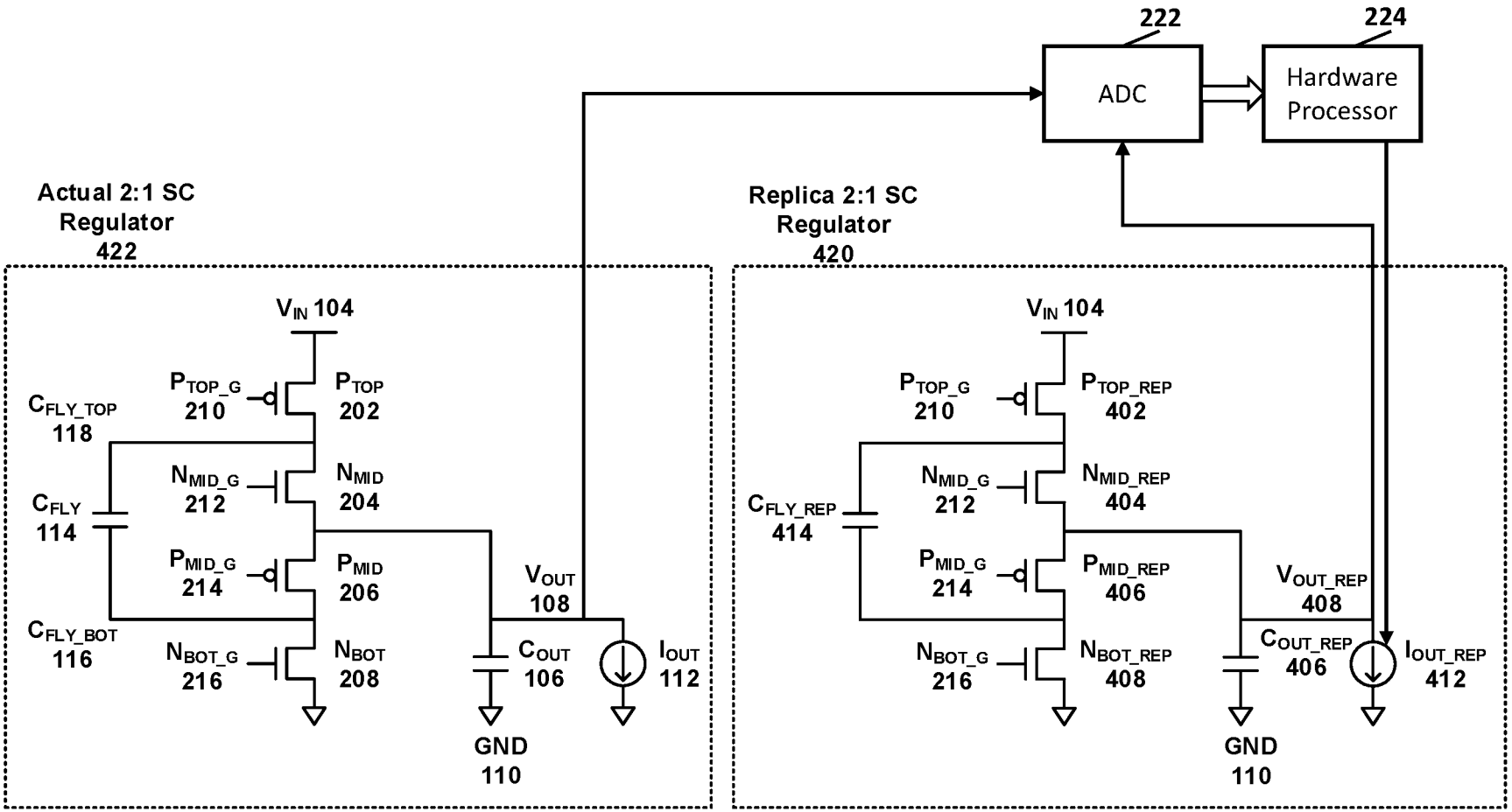
FIG. 4 is schematic diagram of an example of a switched capacitor converter using a replica converter to estimate output current in accordance with some embodiments.

In some embodiments, the mechanisms can measure the output current of a SC regulator by using a replica 2:1 SC regulator that is much smaller than the actual 2:1 SC regulator to estimate $I_{OUT}$ 112. FIG. 4 illustrates an example of a replica SC replica regulator in accordance with some embodiments. As shown, replica 2:1 SC regulator 420 has the same structure and input signals as actual 2:1 SC regulator 422, but its switch widths and capacitor sizes are reduced to 1/N of the counterparts in regulator 422. For example, the capacitance values of $C_{FLY_REP}$ 414 and $C_{OUT_REP}$ 406 are 1/N of the capacitance values of $C_{FLY}$ 114 and $C_{OUT}$ 106, respectively, and the switch widths of $P_{TOP}$ REP 402, $N_{MID_REP}$ 404, $P_{MID_REP}$ 406, and $N_{BOT_REP}$ 408 are 1/N of the switch widths of $P_{TOP}$ 202, $N_{MID}$ 204, $P_{MID}$ 206, and $N_{BOT}$ 208, respectively. The output impedance of replica 2:1 SC regulator 420 is roughly N times larger than the output impedance of actual 2:1 SC regulator 422.

During operation, replica 2:1 SC regulator 420 can be connected to a fixed output current $I_{OUT_REP}$ 412 with a known current value. Given the following relationships:

$$V_{OUT}=V_{IN}/2-R_{OUT}\times I_{OUT};$$

$$V_{OUT_REP}=V_{IN}/2-R_{OUT_REP}\times I_{OUT_REP}; \text{ and}$$

$$R_{OUT_REP}=N\times R_{OUT},$$

if $V_{OUT}=V_{OUT_REP}$, then $I_{OUT}=I_{OUT_REP}\times N$.

To determine $I_{OUT}$, the value of $I_{OUT_REP}$ 412 can be controllably swept to identify at which value of $I_{OUT_REP}$ 412 $V_{OUT_REP}$ 408 becomes equal to $V_{OUT}$ 108, in some embodiments. Then, the identified value of $I_{OUT_REP}$ 412 can be multiplied by N to get $I_{OUT}$ 112, in some embodiments. The voltages $V_{OUT_REP}$ 408 and $V_{OUT}$ 108 can be measured, and $I_{OUT_REP}$ 412 can be controlled, in any suitable manner such as using an analog-to-digital converter (ADC) 222 that is coupled to a hardware processor 224. For example, the hardware processor can adjust $I_{OUT_REP}$ 412 and measure voltages $V_{OUT_REP}$ 408 and $V_{OUT}$ 108 until a setting of $I_{OUT_REP}$ 412 is found at which voltages $V_{OUT_REP}$ 408 and $V_{OUT}$ 108 are equal.

In some embodiments, N can be set to a very large number so that the area overhead of the replica 2:1 SC regulator 420 can be small. An advantage of this approach to measuring $I_{OUT}$ is that $I_{OUT}$ can be measured with little power loss. A disadvantage is that this approach is that it is vulnerable to inaccuracies in the relationships between the capacitances of the replica 2:1 SC regulator and the actual 2:1 SC regulator. More particularly, because the value of $C_{FLY}$ 114 could change with temperature and voltage, if the same type of capacitor (e.g., ceramic capacitor, MOSFET capacitor, etc.) is not used for $C_{FLY_REP}$ 414, the value of $C_{FLY_REP}$ 414 in the replica regulator may not be actually 1/N of the value of $C_{FLY}$ 114 after a temperature change and/or a voltage change. If the capacitance value of $C_{FLY_REP}$ 414 is not actually 1/N of the value of $C_{FLY}$ 114, the assumption of $R_{OUT_REP}=N\times R_{OUT}$ can be wrong, resulting in an inaccurate $I_{OUT}$ 112 value. Another disadvantage is that sweeping $I_{OUT_REP}$ 412 takes time, so calculating $I_{OUT}$ 112 could take longer time. If $I_{OUT}$ 112 keeps changing rapidly, it could be challenging to calculate Tour 112 quickly.

In some embodiments in which it is acceptable to simply know whether $I_{OUT}$ 112 is lower or higher than a certain value, instead of sweeping $I_{OUT_REP}$ 412, $I_{OUT_REP}$ 412 can be set to a fixed current value and $V_{OUT}$ 108 and $V_{OUT_REP}$ 408 can be compared. If $V_{OUT}$ 108 is larger than $V_{OUT_REP}$ 408, this indicates that Tour 112 is smaller than N times $I_{OUT_REP}$ 412. If $V_{OUT}$ 108 is smaller than $V_{OUT_REP}$ 408, this indicates that $I_{OUT}$ 112 is larger than N times $I_{OUT_REP}$ 412. An advantage of this approach is that it does not require sweeping $I_{OUT_REP}$ 412 and can get the result more quickly. A disadvantage of this approach is that it does not measure the value of Tour 112, but merely indicates whether $I_{OUT}$ 112 is larger or smaller than a certain value.

The techniques described above can be used in 2:1 SC regulators that are different from the ones in the figures. For example, PMID 206 and $P_{TOP}$ 202 could be NMOS FETs. Also, these techniques can be used in N:M SC regulators other than 2:1 SC regulators.

As described above, various measurements are made, data (e.g., estimates) used, values calculated, and controls implemented (e.g., sweeping values of $I_{OUT_REP}$). Any suitable general-purpose computer or special-purpose computer can be used to perform these functions in some embodiment. Any such general-purpose computer or special-purpose computer can include any suitable hardware. For example, such hardware can include a hardware processor and memory.

The hardware processor can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor can be controlled by a program stored in the memory.

The memory can be any suitable memory and/or storage for storing programs, data, and/or any other suitable information in some embodiments. For example, the memory can include random access memory, read-only memory, flash memory, hard disk storage, optical media, and/or any other suitable memory.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A circuit for measuring a current provided to a load comprising a capacitor having a first side and a second side;

a plurality of switches that, when in a first state, couple the capacitor in parallel with the load and, when in a second state, couple the capacitor in series with the load, wherein a first switch of the plurality of switches has a first side, a second side, and a control input and connects the first side of the capacitor to ground when the plurality of switches are in the first state and wherein a second switch of the plurality of switches has a first side, a second side, and a control input and connects the second side of the capacitor to an input voltage when the plurality of switches are in the second state;

a third switch having a first side, a second side, and a control input, wherein the first side of the third switch is connected to the first side of one of the first switch and the second switch, wherein the control input of the third switch is connected to the control input of the one of the first switch and the second switch, and wherein the third switch is smaller than the one of the first switch and the second switch;

a first resistor having a first side and a second side, wherein the first side of the first resistor is directly connected to the second side of the third switch; and a hardware processor that measures a current flowing through the first resistor and estimates the current provided to the load based on the current measured as flowing through the first resistor.

2. The circuit for measuring a current provided to a load of claim 1, wherein the one of the first switch and the second switch is the first switch.

3. The circuit for measuring a current provided to a load of claim 2, wherein the first switch and the third switch are NMOS transistors and wherein the second switch is a PMOS transistor.

4. The circuit for measuring a current provided to a load of claim 2, wherein the second side of the resistor is connected to ground.

5. The circuit for measuring a current provided to a load of claim 1, wherein the one of the first switch and the second switch is the second switch.

6. The circuit for measuring a current provided to a load of claim 5, wherein the second switch and the third switch are PMOS transistors and wherein the first switch is an NMOS transistor.

7. The circuit for measuring a current provided to a load of claim 5, wherein the second side of the resistor is connected to the input voltage.

8. The circuit for measuring a current provided to a load of claim 5, further comprising:

a fourth switch having a first side, a second side, and a control input, wherein the first side of the fourth switch is connected to the first side of the first switch, wherein the control input of the fourth switch is connected to the control input of the first switch, and wherein the fourth switch is smaller than the first switch; and a second resistor having a first side and a second side, wherein the first side of the second resistor is connected to the second side the fourth switch and wherein the second side of the second resistor is connected to ground, wherein the hardware processor also measures a current flowing through the second resistor and estimates the current provided to the load based on the current measured as flowing through the second resistor.

9. The circuit for measuring a current provided to a load of claim 8, wherein the hardware processor estimates the current provided to the load based on a combination of the current flowing through the first resistor and the current flowing through the second resistor.

10. The circuit for measuring a current provided to a load of claim 1, wherein the third switch has a width that is equal to or smaller than 1/10th of a width of the one of the first switch and the second switch.

11. The circuit for measuring a current provided to a load of claim 1, wherein the third switch has a width that is equal to or smaller than 1/100th of a width of the one of the first switch and the second switch.

12. The circuit for measuring a current provided to a load of claim 1, wherein the third switch has a width that is equal to or smaller than 1/1000th of a width of the one of the first switch and the second switch.

13. The circuit for measuring a current provided to a load of claim 1, further comprising an analog-to-digital converter that measures a voltage at the first side of the first resistor.

14. The circuit for measuring a current provided to a load of claim 1, wherein the hardware processor measures the current flowing through the first resistor by determining a voltage across the resistor and dividing the voltage across the resistor by a known value of the resistor.

15. The circuit for measuring a current provided to a load of claim 1, wherein the hardware processor estimates the current provided to the load by dividing the current flowing through the first resistor by a percentage of time that the plurality of switches are in the first state when the one of the first switch and the second switch is the first switch and by a percentage of time that the plurality of switches are in the second state when the one of the first switch and the second switch is the second switch.

*16. A regulator comprising:*

*a plurality of switches, wherein a first switch of the plurality of switches has a first size;*

*a capacitor;*

*a second switch having a second size that is smaller than the first size;*

*a first resistor having one end connected directly to one side of the second switch; and*

*a hardware processor configured to calculate an output current of the regulator based upon a voltage measured across the first resistor,*

*wherein the second switch and the first resistor are connected in series, and are collectively in parallel with the first switch, and*

*wherein, when in a first state, the plurality of switches couple the capacitor in parallel with a load and, when in a second state, the plurality of switches couple the capacitor in series with the load.*

*17. The circuit of claim 16, further comprising an analog-to-digital converter that measures a voltage at the first side of the first resistor.*

*18. The regulator of claim 16, wherein the first switch connects the first side of the capacitor to ground when the plurality of switches are in the first state.*

*19. The circuit of claim 18, wherein the hardware processor also estimates the output current provided to a load by dividing an amount of current flowing through the first resistor by a percentage of time that the plurality of switches are in the first state.*

*20. The regulator of claim 16, wherein the first switch connects the capacitor to an input voltage when the plurality of switches are in the second state.*

*21. The circuit of claim 20, further comprising a hardware processor that estimates the output current provided to a load by dividing an amount of current flowing through the first resistor by a percentage of time that the plurality of switches are in the second state.*

*22. The regulator of claim 16, wherein the plurality of switches includes a third switch having a third size, further comprising:*

*a fourth switch having a fourth size that is smaller than the third size; and*

*a second resistor having one end connected to one side of the fourth switch,*

*wherein the fourth switch and the second resistor are connected in series, and are collectively in parallel with the third switch, and*

*wherein the output current of the regulator is estimated based upon voltages measured across the first resistor and the second resistor.*

*23. The circuit of claim 16, wherein the first size and the second size are transistor widths, and wherein the second size is equal to or smaller than 1/10th of the first size.*

*24. The circuit of claim 16, wherein the first size and the second size are transistor widths, and wherein the second size is equal to or smaller than 1/100th of the first size.*

*25. The circuit of claim 16, wherein the first size and the second size are transistor widths, and wherein the second size is equal to or smaller than 1/1000th of the first size.*

* * * * *